March 26, 1968  F. W. EARNEST III, ETAL  3,374,541
DEVICE FOR CUTTING FLOWER STEMS AND THE LIKE
Filed Jan. 27, 1967  2 Sheets-Sheet 1

INVENTOR.
FRANK W. EARNEST, III
ALBERT H. TORONGO, JR.

Edelson and Udell
ATTORNEYS

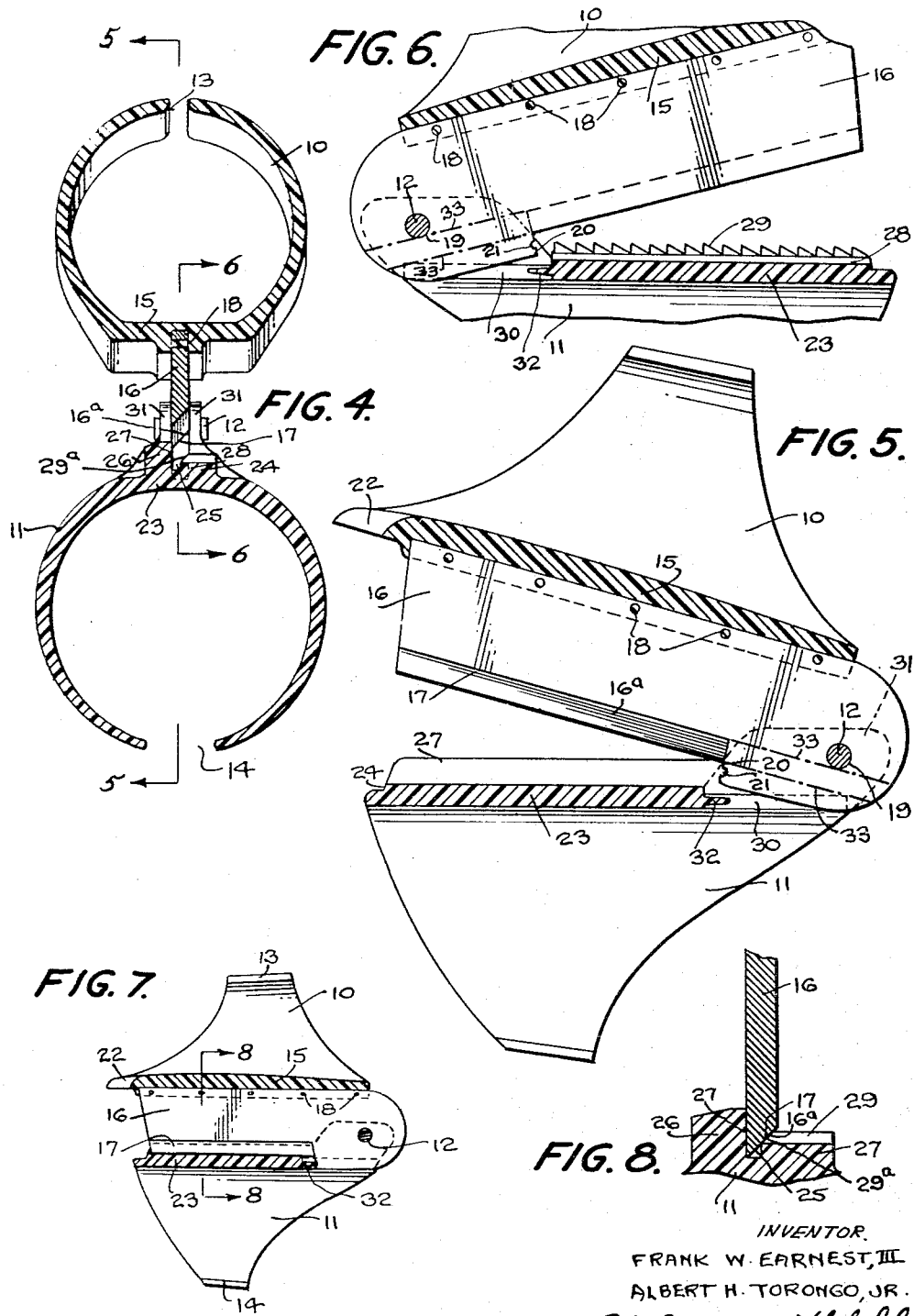

United States Patent Office 3,374,541
Patented Mar. 26, 1968

3,374,541
DEVICE FOR CUTTING FLOWER
STEMS AND THE LIKE
Frank W. Earnest III, Williamsport, and Albert H. Torongo, Jr., Yardley, Pa., assignors to Frank W. Earnest, Jr., doing business as Frank Earnest Company, Williamsport, Pa.
Continuation-in-part of application Ser. No. 541,157, Apr. 8, 1966. This application Jan. 27, 1967, Ser. No. 612,152
5 Claims. (Cl. 30—232)

ABSTRACT OF THE DISCLOSURE

The device embodying the present invention is a gardening tool characterized by the provision of a pair of pivotally connected members which are respectively provided with shearing elements, the pivoted members being designed to be respectively engaged and held by the thumb and a finger of the hand of a user so that upon conjoint movement of the thumb and finger the members are moved relatively to one another in a scissors-like manner to sever and trim flower stems and effect light pruning of shrubbery and the like.

---

This application is a continuation-in-part of our previously filed pending application Ser. No. 541,157, filed Apr. 8, 1966.

This invention relates generally to a gardening tool and more particularly to an improved construction of a tool which is adapted to be fitted upon and operated by the hand of the user to quickly and easily sever and trim flower stems, as well as effect light pruning of shrubbery and the like.

Among the principal objects of the present invention is to provide a shearing device which when fitted on the hand of the user may be easily and efficiently operated by conjoint movement of the thumb and an adjacent finger of the hand to cut the stems of flowers and perform other light pruning and trimming of plants and shrubs.

Other important objects are to provide a device which is of simple and inexpensive design and construction, which is efficient and safe in use and which, while easily and readily adapted to be slipped on and off of the hand of the user, may nevertheless be firmly held in operative position upon the hand for positive and effective shearing action.

Still other objects and advantages of the invention will appear more fully hereinafter, it being understood that the present invention consists substantially in the combination, construction, location and relative arrangement of parts, as described in detail in the following specification, as shown in the accompanying drawings and as finally pointed out in the appended claims.

In the drawings which illustrate a preferred embodiment of the tool of the present invention:

FIGURE 4 is a vertical transverse sectional view thereof as taken along the line 4—4 of FIGURE 3;

FIGURE 5 is a vertical longitudinal sectional view as taken along the line 5—5 of FIGURE 4, showing the tool in its partially opened condition;

FIGURE 6 is a partial vertical longitudinal sectional view as taken along the line 6—6 of FIGURE 4;

FIGURE 7 is a view similar to FIGURE 5 but on a reduced scale and showing the tool in its closed condition; and FIGURE 8 is a detail sectional view as taken along the line 8—8 of FIGURE 7.

Figure 1:
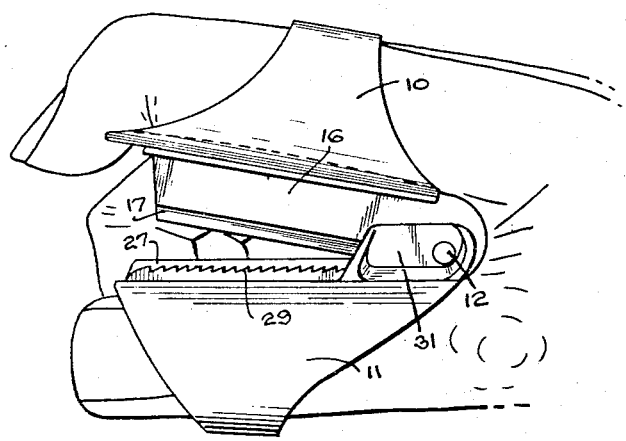
FIGURE 1 is a side elevational view showing the flower stem cutter constructed in accordance with the principles of the present invention operatively mounted upon the thumb and forefinger of the user's hand.

Referring now more particularly to the drawings, it will be observed the device of the present invention generally comprises a pair of finger-engaging members 10 and 11 which are pivotally secured together, as will appear more fully hereinafter, by a pivot pin 12 to permit the same to be moved relatively to one another in a scissors-like manner. The members 10 and 11, which may be formed of any suitable material but are preferably molded of a suitable high impact strength and scratch resistant plastic material, such as polypropylene, polycarbonate, acetal, nylon, acrylic and the like, are each of ring-like shape in transverse cross-section and of lengths sufficient to encompass, respectively, the major portions of the thumb and any adjacent finger of the hand upon which the device is fitted for use. Preferably, the members 10 and 11 are each longitudinally slitted, as at 13 and 14, so as to provide each of the same with opposed side walls which are inherently inwardly biased to snugly embrace the finger and yet be sufficiently yieldable to comfortably fit fingers of varying girth.

The pivoted members 10 and 11 are relatively disposed with their longitudinal axes in the longitudinally extending vertical median plane of the device, so that it may be fitted upon either the right or left hand for scissors-like movement of the members about their pivot 12 which, when the device is hand-mounted for use, is located substantially in the crotch between the thumb and forefinger of the hand.

The ring-like member 10, which preferably is that which is fitted upon the index or middle finger of the hand, is provided with a relatively flat base or platform portion 15 into the bottom of which is suitably set a cutter blade 16 which is beveled, as at 16a, to provide it with a sharpened shearing edge 17. This blade 16, which extends longitudinally along the length of the member 10 and is disposed in the median plane thereof, is permanently locked into the plastic material of which the ring member is formed by the provision in said cutter blade of longitudinally spaced holes 18 into which the plastic material flows during the operation of molding the ring member to shape with the blade set therein as an integral part of the member 10.

As most clearly appears in FIGURES 5 and 6, the rear end portions of the steel cutter blade 16, which is apertured, as at 19, to receive the pivot pin 12, projects somewhat beyond the rear edge of the base or platform portion 15 of the finger-engaging member 10 and may be of depth sufficient to provide a shoulder 20 extending substantially at right angles to the cutting edge of the blade immediately at the rear end of said cutting edge. When such shoulder is provided there may be formed therein a detent notch 21 for a purpose which will appear hereinafter.

Figure 2:
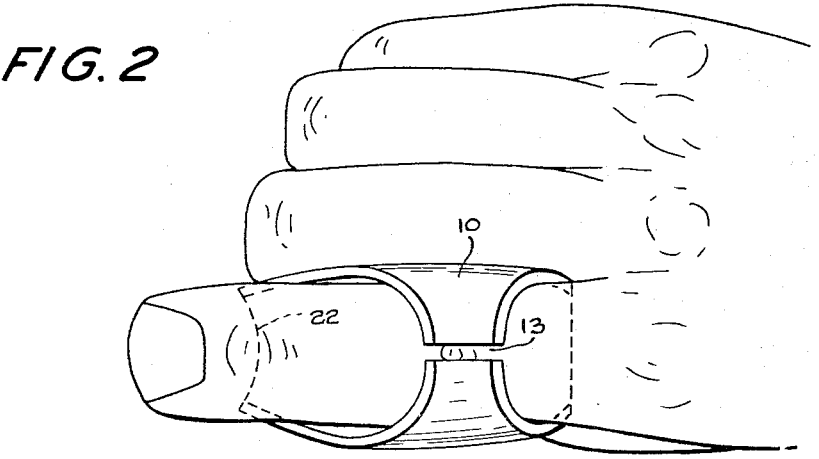
FIGURE 2 is a top plan view thereof.
Figure 3:
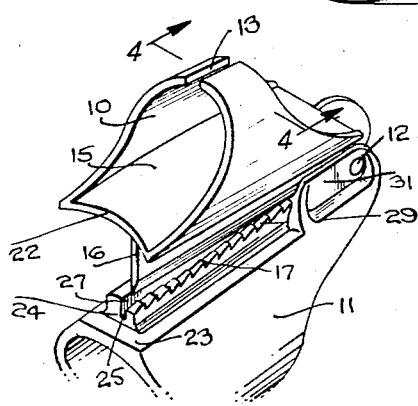
FIGURE 3 is a perspective view showing the tool of the present invention.

The base or platform portion 15 of the finger-engaging member 10 extends forwardly beyond the front end of the cutter blade 16 and is provided with an arcuately shaped front end 22, as best appears in FIGURES 1, 2 and 3, to provide an edge about which the first phalange of the finger may be bent to firmly retain the cutting device in operative position upon the hand with its pivot located in the crotch between the thumb and forefinger.

The ring-like member 11, which receives the thumb, is also provided with a relatively flattened base or platform portion 23 from the upper surface of which upwardly projects a longitudinally grooved blade-receiving portion 24 formed as an integral part of the member 11. This portion 24, which is of a length substantially coextensive with that of the cutting edge 17 of the blade 16, is provided with a longitudinal groove 25 adapted to receive the blade cutting edge. This groove 25 is defined along one side thereof by an upstanding wall part 26 the inner surface 27 of which is coplanar with the flat (not beveled) side of the cutter blade and constitutes the shear surface with which the cutting edge of the blade 16 coacts to shear the flower stem or the like which is being cut.

The opposite side of the blade-receiving groove 25 is defined by an upstanding wall part 28 which is of a vertical depth substantially less than that of the shear wall part 26. The upper surface of this relatively shallow wall part 28 is provided with relatively broad saw-toothlike teeth 29 or other serrations adapted to engage the flower stem under pressure of the cutter blade to prevent its shifting outwardly from the nip of the shear during the cutting operation. The inner edges of these serrations or teeth 29 are beveled or chambered, as at 29a, to provide surfaces which lie in an inclined plane paralleling the inclined plane of the beveled portion 16a of the cutter blade 16.

The rear end of the base or platform portion 24 of the member 11 is slotted, as at 30, and rising from opposite sides of this slotted portion of the member 11 are a pair of upstanding laterally spaced ears or lugs 31—31 respectively provided with registering apertures for receiving the pivot pin 12. The apertured rear end portion of the cutter blade 16 is received between the ears 31—31 of the thumb-receiving member 11 and is pivotally secured thereto by the pivot pin, the pivotal arrangement being such that when the members 10 and 11 are brought together into closed position, as shown in FIGURE 7, the full length of the cutting edge 17 of the cutter blade reaches the bottom of the groove 25 formed in the member 11 and so insures effective cutting completely through the flower stem or the like which is supported for cutting well above the bottom of said groove.

The depth of the blade-receiving groove 25 is such that when the blade is swung into its fully closed position, as shown for example in FIGURES 7 and 8, its beveled surface 16a engages the inclined complementally beveled surfaces 29a of the serrations or teeth 16 to thereby limit downward movement of the blade to a point at which its cutting edge 27 is just short of actual contact with the bottom of the groove 25 formed in the top of the plastic thumb receiving member 11. This effectively eliminates such penetration of the blade into the plastic member and cutting of the latter as might eventually weaken the member, at the same time that it prevents premature dulling of the cutting edge of the blade.

It will be noted that the slotted portion 30 of the member 11 terminates at a point spaced forwardly of the notched shoulder 20 of the blade 16 when the latter is in its closed position thereby permitting the bladed member 10 to freely swing into its closed position as shown in FIGURE 7 without interference. The grooved base or platform portion 23 of the thumb-receiving member 11 is integrally provided at its rear end with a rearwardly projecting fin 32 which lies between the opposite side walls of the groove 30 and is free to flex relatively to the base portion 23 of the member 11. The projecting length of this flexible element 32 is such that when the blade-fitted part of the cutter device is swung into its closed position, the free rear edge of the element 32 snaps into the notch 21 of the pivoted portion of the blade and serves as a detent to hold the device in its closed position. This detenting is, however, of such slight holding effort as not to interfere with normal cutting operations of the device when the same is mounted upon the hand and is actuated by relative movement of the thumb and finger respectively projected through the ring-like members 10 and 11.

Should it be desired to eliminate the detenting action just described, it is only necessary to omit the notch 21 in the shoulder 20 and its cooperating detenting fin 32. In such case, the beveled portion 16a of the cutting blade may be extended rearwardly beyond the pivoted end of the blade between the dot and dash lines 33—33 shown in each of FIGURES 6 and 7, thereby reducing the depth of the cutter blade in the region of its pivot and so eliminating the provision of the shoulder 20. It has been found that by extending the cutting edge 27 of the blade to its full length as just described, the blade may be more readily and effectively sharpened and resharpened.

It will be understood, of course, that the present invention is susceptible of various changes and modifications which may be made from time to time without departing from the real spirit or general principles of the invention, and it is accordingly intended to claim the same broadly, as well as specifically, as indicated by the appended claims.

What is claimed as new and useful is:

1. A gardening device for cutting flower stems and the like, comprising, in combination, a pair of members formed of plastic material adapted respectively to be engaged by the thumb and an adjacent finger of the hand of the user of the device, said members being respectively provided with integral elongated rigid base portions of lengths respectively adapted to overlie a major portion of the thumb and the two inner phalanges of the finger, a shear blade fixed to and carried by the base portion of one of said members, said shear blade having on one side thereof a flat surface and on its other side a beveled surface to form a cutting edge extending lengthwise of the sheer blade, the second of said members having formed in its base portion a longitudinally extending groove for receiving the cutting edge of said blade, said groove being defined by a pair of upwardly projecting ribs integrally formed on said second member, one of said ribs being in shearing relation to the cutting edge of said shear blade and the other of said ribs being of substantially less vertical depth than said shear rib and having a serrated upper surface adapted to grip the stem being cut and prevent outward shifting thereof from the nip of the shear elements during the operation of cutting the flower stem or the like, the inner edge of said serrated surface being beveled to an angle complemental to that of the beveled surface of the shear blade, the relative dimensions of said shear blade and groove being such that said complementally beveled surfaces coact to limit penetration of the shear blade cutting edge into the groove to a point just short of the bottom of said groove, and means pivotally connecting said members to permit relative movement thereof for shearing action between said shear blade and said shear rib, said pivot means, being located, when the device is fitted upon the hand for use, approximately in the region of the crotch between the thumb and index finger of the hand.

2. A gardening device for cutting flower stems and the like, comprising, in combination, a pair of members formed of plastic material adapted respectively to be engaged by the thumb and an adjacent finger of the hand of the user of the device, said members being respectively provided with integral elongated rigid base portions of lengths respectively adapted to overlie a major portion of the thumb and the two inner phalanges of the finger, a shear blade fixed to and carried by the base portion of a first one of said members, said shear blade having on one side thereof a flat surface and on its other side a beveled surface to form a cutting edge extending lengthwise of the shear blade, the rear end portion of said shear blade being provided with a shoulder extending substantially at right angles to the cutting edge of the blade, and having a detent notch formed therein with its mouth presenting forwardly of the device, the base portion of the second of said members being provided with a longitudinally extending groove for receiving the cutting edge of said blade and with a rearwardly projecting flexible detent which seats in said notch to hold the device in its closed condition, said second member having integrally formed thereon an upwardly projecting rib forming a side wall of said groove in shearing relation to the cutting edge of said shear blade and means pivotally connecting said members to permit relative movement thereof and shearing action between said shear blade and said side wall of the groove, said pivot means, being located, when the device is fitted upon the hand for use, approximately in the region of the crotch between the thumb and index finger of the hand.

3. A gardening device as defined in claim 1 wherein said thumb and finger-receiving members are each of generally circular form in transverse cross-section and wherein said cutter blade is keyed into its associated plastic member.

4. A gardening device as defined in claim 1 wherein said grooved second member is provided at its rear end with a pair of laterally spaced ears which embrace the rear portion of said shear blade and wherein said pivot means includes a pivot pin extending transversely through said ears and the portion of the shear blade embraced therebetween.

5. A gardening device as defined in claim 1 wherein the base portion of the finger-receiving member is arcuately shaped at its frontal end in substantial correspondence with the shape of the finger in the region of its first joint.

References Cited

UNITED STATES PATENTS

| 288,096 | 11/1883 | Morgan | 30—232 |
| 660,709 | 10/1900 | McGhee | 30—232 |
| 1,802,905 | 4/1931 | Bryant | 30—254 |
| 2,627,656 | 2/1953 | Richartz | 30—254 |

FOREIGN PATENTS 439,019  12/1926  Germany.

OTBELL M. SIMPSON, *Primary Examiner.*

WILLIAM FELDMAN, *Examiner.*

J. C. PETERS, *Assistant Examiner.*